United States Patent
Jiao et al.

(10) Patent No.: US 10,797,829 B2
(45) Date of Patent: Oct. 6, 2020

(54) WIRELESS COMMUNICATION APPARATUS AND WIRELESS COMMUNICATION METHOD

(71) Applicant: Huawei Technologies Co., Ltd., Shenzhen (CN)

(72) Inventors: Shurong Jiao, Shanghai (CN); Meng Hua, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/540,851

(22) Filed: Aug. 14, 2019

(65) Prior Publication Data

US 2019/0372714 A1 Dec. 5, 2019

Related U.S. Application Data

(63) Continuation of application No. PCT/CN2019/071019, filed on Jan. 9, 2019.

(30) Foreign Application Priority Data

Jan. 12, 2018 (CN) .......................... 2018 1 0032375

(51) Int. Cl.
*H04L 5/00* (2006.01)
*H04L 1/00* (2006.01)
(Continued)

(52) U.S. Cl.
CPC ........... *H04L 1/0071* (2013.01); *H04W 72/04* (2013.01)

(58) Field of Classification Search
CPC ............... H04W 72/042; H04B 7/0413; H04L 25/0204; H04L 5/0026; H04L 5/0051; H04L 5/0094
See application file for complete search history.

(56) References Cited

U.S. PATENT DOCUMENTS

2009/0310475 A1* 12/2009 Seo .................... H04W 72/1273
370/203
2014/0112283 A1* 4/2014 Kim ...................... H04L 5/0053
370/329
(Continued)

FOREIGN PATENT DOCUMENTS

CN 101039297 A 9/2007
CN 101102140 A 1/2008
(Continued)

OTHER PUBLICATIONS

3rd Generation Partnership Project, Physical layer procedures for data (Release 15), 3GPP TS 38.214, V15.00, Dec. 2017 (Year: 2017).*

(Continued)

*Primary Examiner* — Un C Cho
*Assistant Examiner* — Peter K Mak
(74) *Attorney, Agent, or Firm* — Slater Matsil, LLP

(57) ABSTRACT

A wireless communication apparatus and a wireless communication method are provided. The wireless communication method includes: determining a quantity of virtual resource blocks in an initial resource block bundle based on a resource block start index of a bandwidth part and a size of a resource block bundle, wherein the quantity of virtual resource blocks in the initial resource block bundle is less than the size of the resource block bundle; and mapping the virtual resource blocks in the initial resource block bundle to physical resource blocks.

23 Claims, 18 Drawing Sheets

(51) Int. Cl.
*H04W 72/04* (2009.01)
*H04B 7/0456* (2017.01)

(56) References Cited

U.S. PATENT DOCUMENTS

| | | | |
|---|---|---|---|
| 2014/0314036 A1* | 10/2014 | Takeda | H04L 5/0048 |
| | | | 370/329 |
| 2016/0227520 A1 | 8/2016 | Davydov et al. | |
| 2017/0332398 A1 | 11/2017 | Seo et al. | |
| 2018/0343611 A1 | 11/2018 | Jiao et al. | |
| 2019/0150118 A1* | 5/2019 | Nam | H04L 5/0094 |
| | | | 370/329 |
| 2019/0200307 A1* | 6/2019 | Si | H04L 27/2666 |
| 2019/0215809 A1* | 7/2019 | Yang | H04B 7/0413 |

FOREIGN PATENT DOCUMENTS

| | | |
|---|---|---|
| CN | 101778394 A | 7/2010 |
| CN | 102412951 A | 4/2012 |
| WO | 2017132955 A1 | 8/2017 |

OTHER PUBLICATIONS

"3GPP TS 38.211 V15.0.0 (Dec. 2017)", 3rd Generation Partnership Project; Technical Specification Group Radio Access Network; NR; Physical channels and modulation (Release 15), 73 pages.
"3GPP TS 38.331 V15.0.0 (Dec. 2017)", 3rd Generation Partnership Project; Technical Specification Group Radio Access Network NR Radio Resource Control (RRC) protocol specification (Release 15), 188 pages.
"3GPP TS 38.214 V15.0.0 (Dec. 2017)", 3rd Generation Partnership Project; Technical Specification Group Radio Access Network; NR; Physical layer procedures for data (Release 15), 71 pages.
Nokia et al., "On resource allocation for PDSCH and PUSCH in NR", 3GPP TSG HAN WG1 Meeting 90bis; R1-1718620, Oct. 9-13, 2017, 10 pages.

* cited by examiner

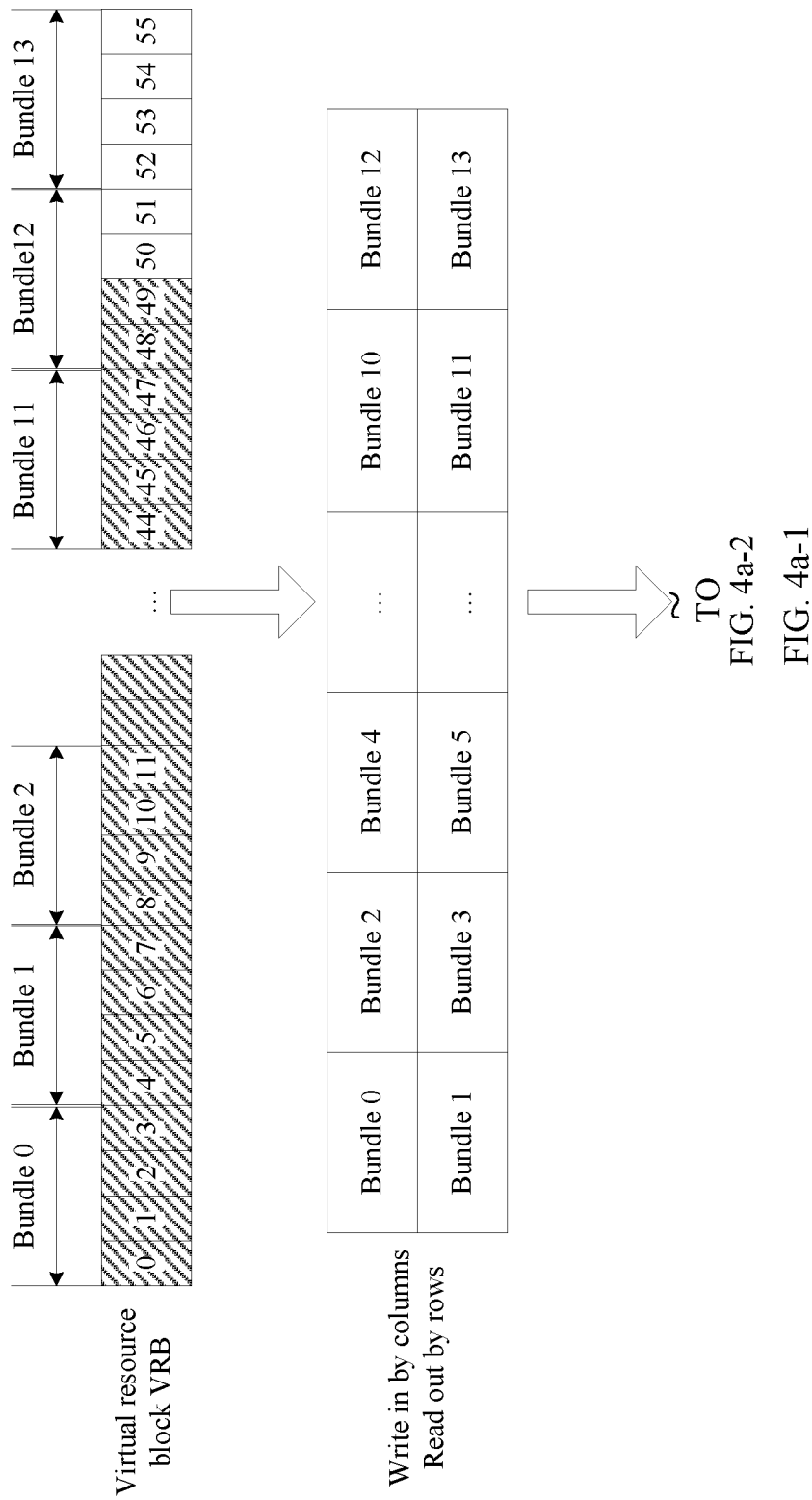

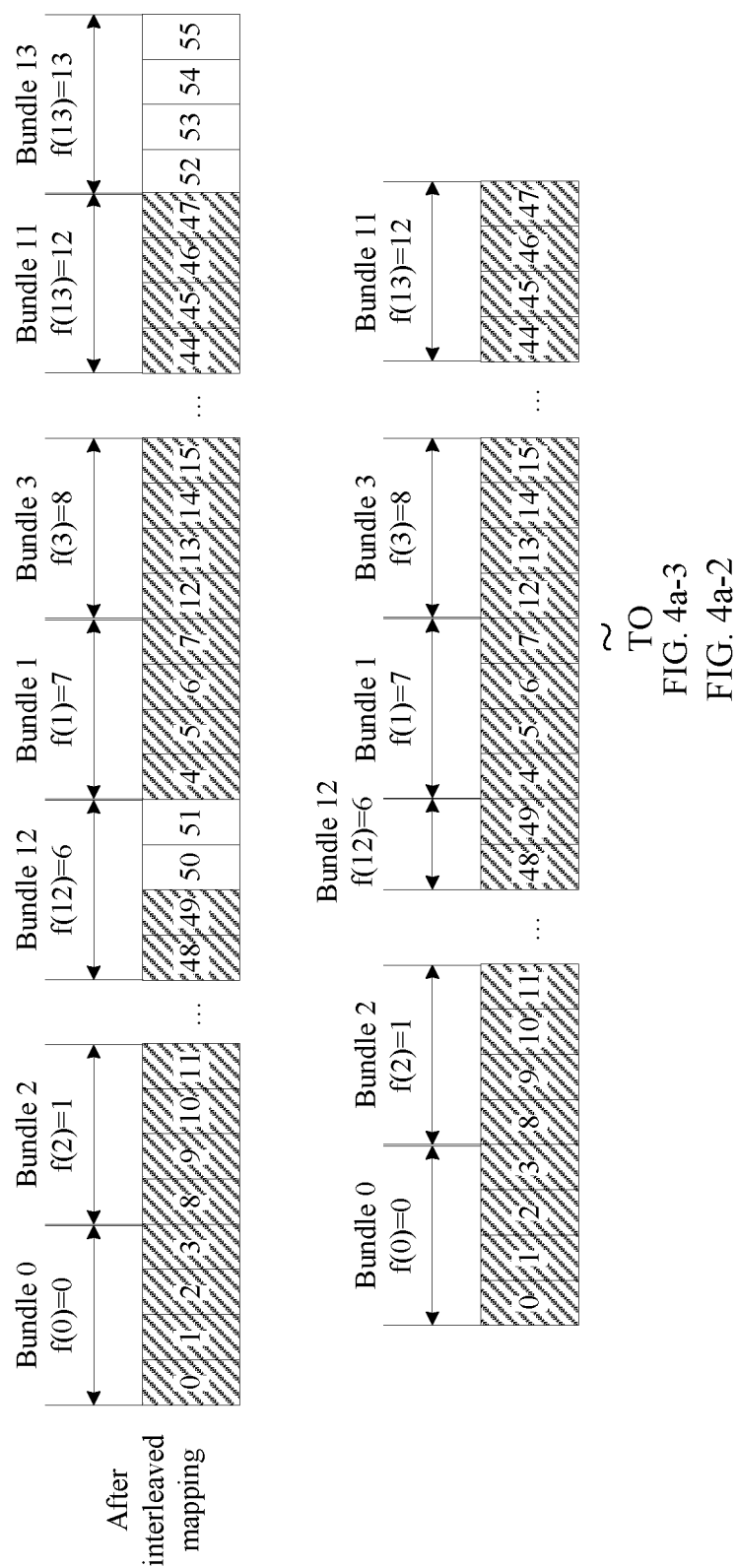

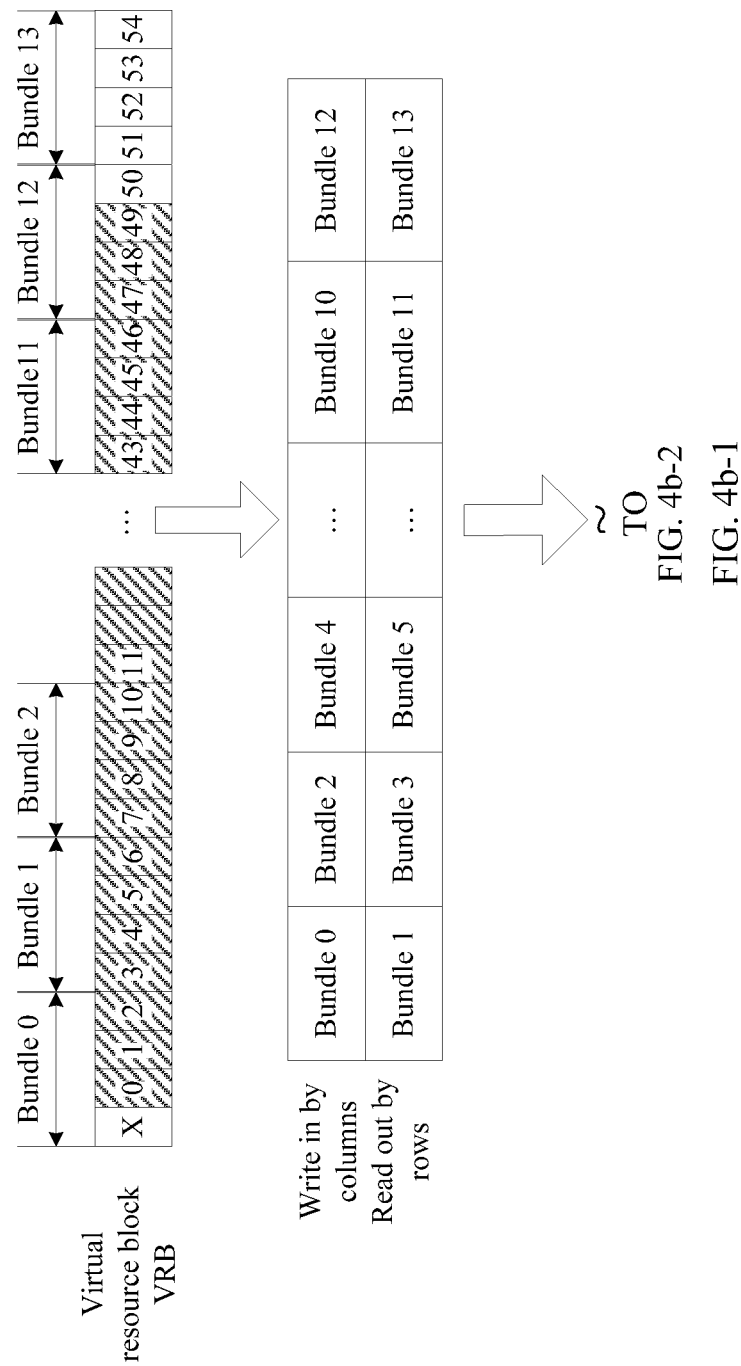

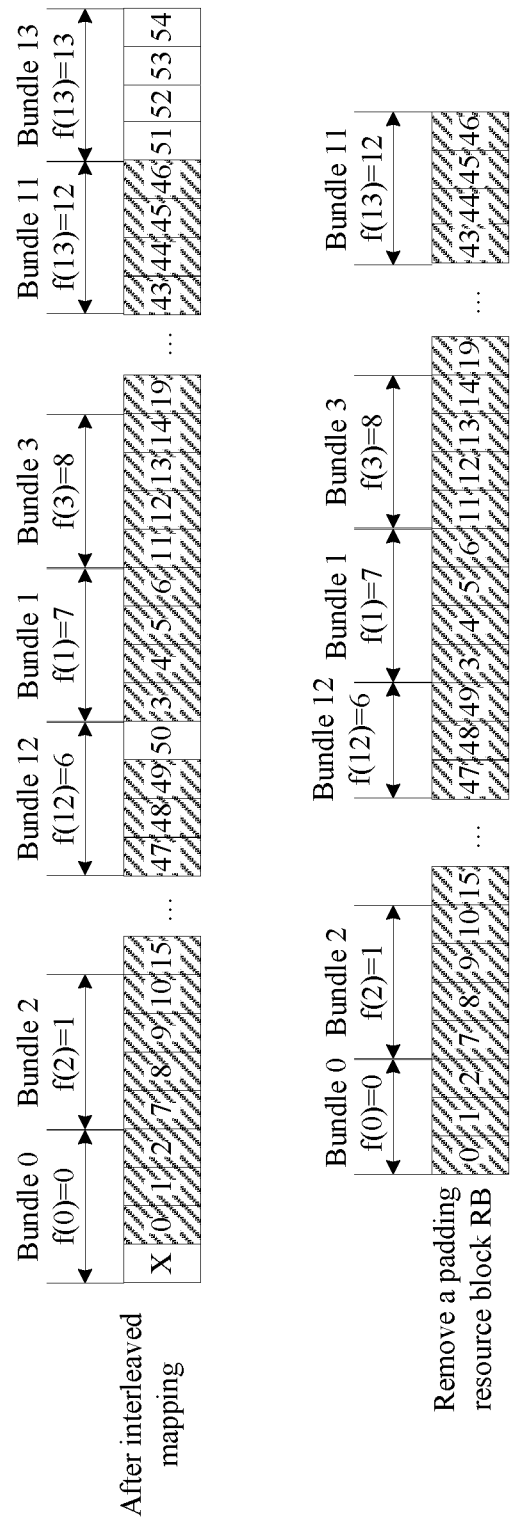

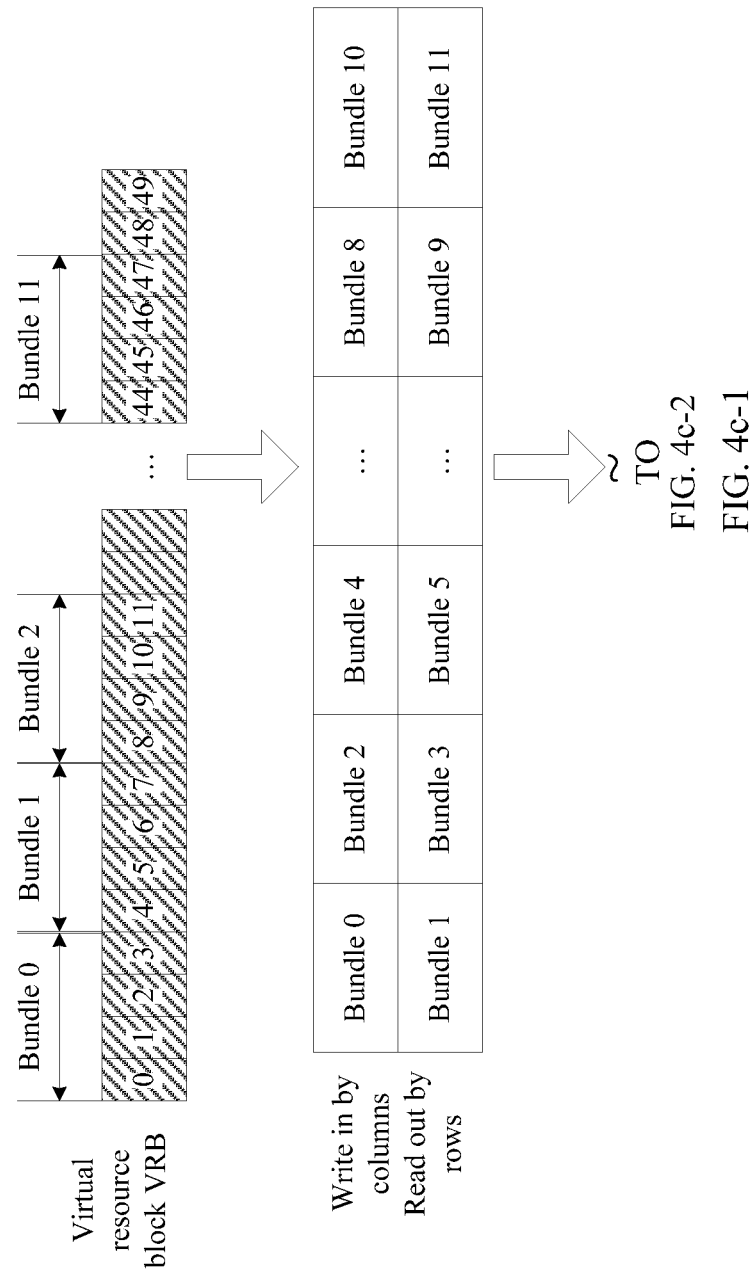

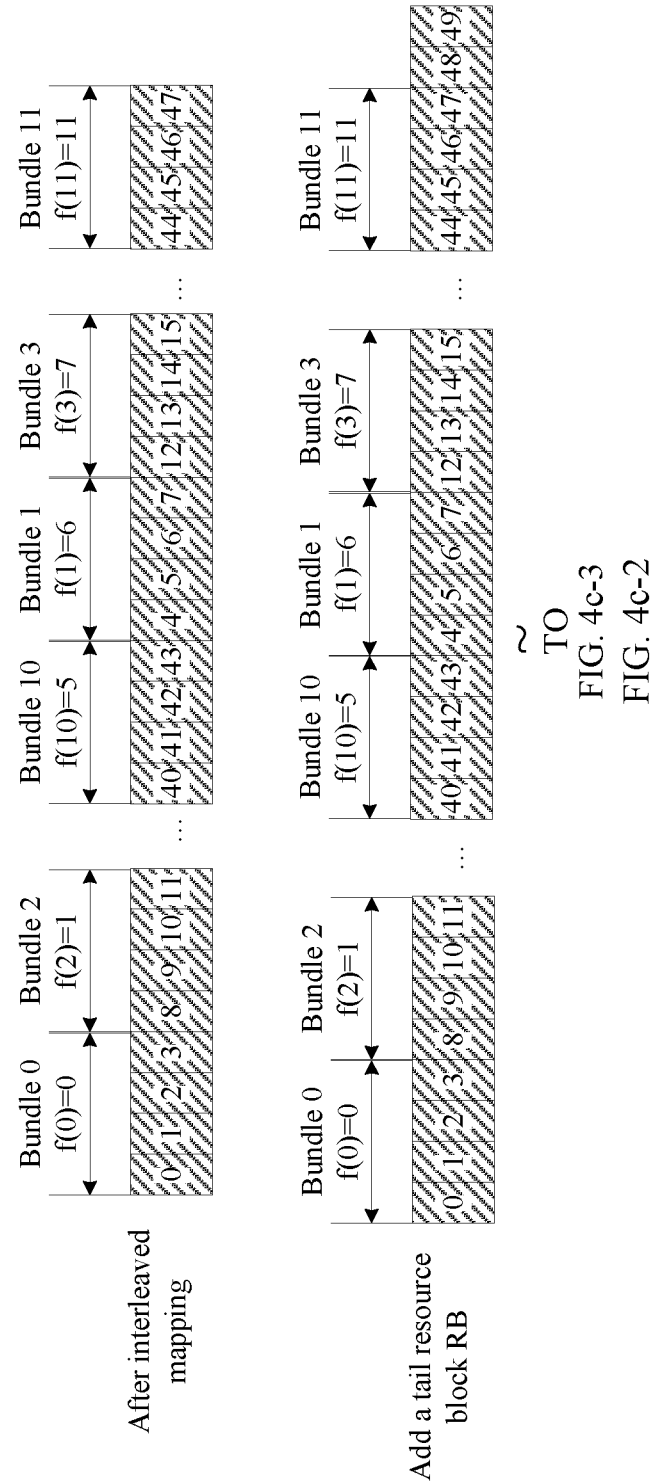

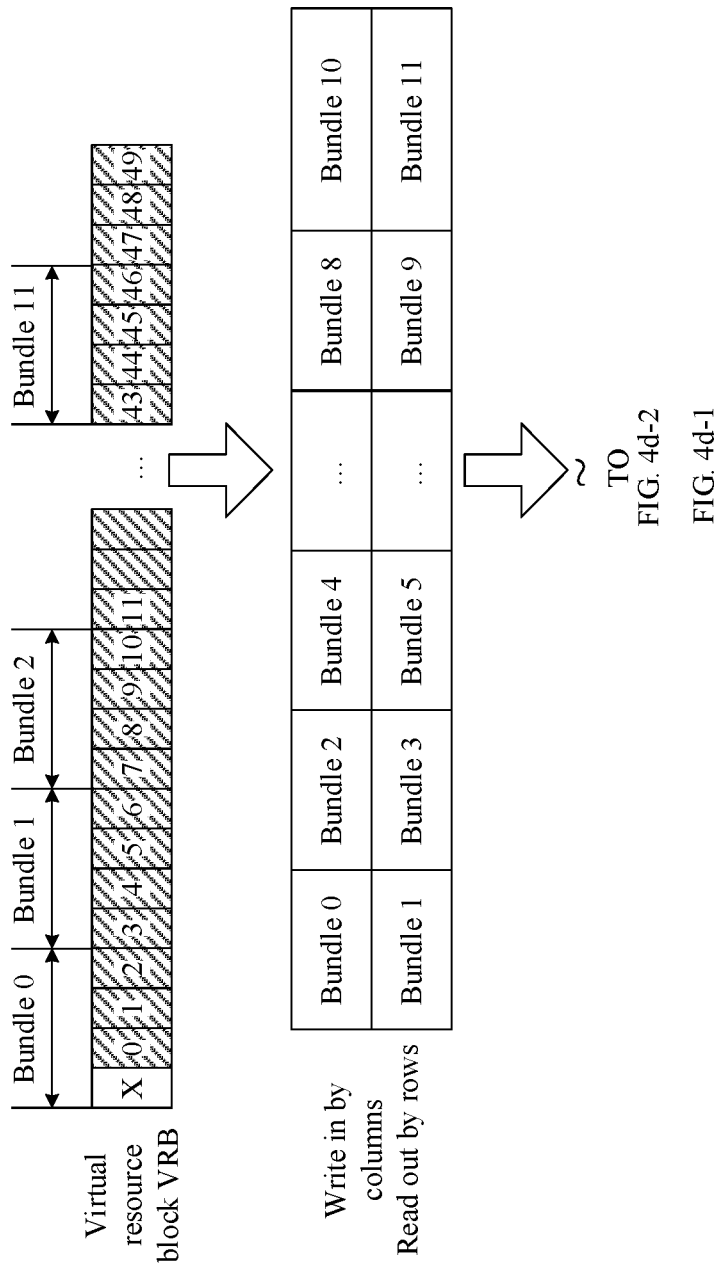

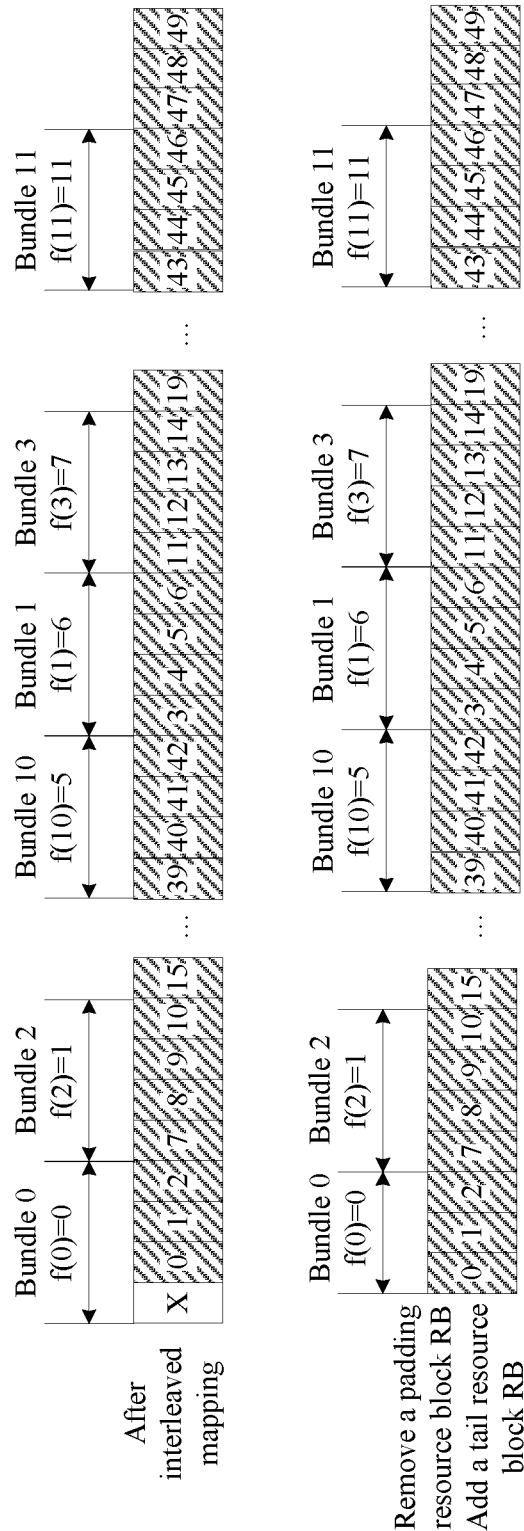

WIRELESS COMMUNICATION APPARATUS AND WIRELESS COMMUNICATION METHOD

CROSS-REFERENCE TO RELATED APPLICATIONS

This application is a continuation of International Application No. PCT/CN2019/071019, filed on Jan. 9, 2019, which claims priority to Chinese Patent Application No. 201810032375.4, filed on Jan. 12, 2018. The disclosures of the aforementioned applications are hereby incorporated by reference in their entireties.

TECHNICAL FIELD

The present application relates to the field of communication technologies, and in particular, to a wireless communication apparatus and a wireless communication method.

BACKGROUND

A resource block (RB) is used to describe a mapping relationship between a specific physical channel and a resource element. In a wireless communication system, RBs are divided into a physical resource block (PRB) and a virtual resource block (VRB). During downlink (or uplink) data transmission, a downlink (or uplink) transmission resource is allocated based on a VRB, and then the VRB is mapped to a PRB. VRB-to-PRB mapping has two types: non-interleaved mapping and interleaved mapping. For the non-interleaved mapping, a VRB is directly mapped to a PRB. For the interleaved mapping, interleaving needs to be first performed, and then an interleaved VRB is mapped to a PRB. Currently, for the interleaved mapping, how to implement a VRB-to-PRB mapping process still needs to be further studied.

SUMMARY

This application provides a wireless communication apparatus and a wireless communication method, to provide an implementation solution for VRB-to-PRB mapping.

According to a first aspect, an embodiment of this application provides a wireless communication apparatus. The apparatus includes a processing unit, configured to determine indexes of virtual resource blocks in a plurality of resource block bundles based on a resource block start index of a bandwidth part and a size of a resource block bundle. The apparatus also includes a mapping unit, configured to perform interleaved mapping to the plurality of resource block bundles, to determine indexes of physical resource blocks corresponding to the indexes of the virtual resource blocks.

The plurality of resource block bundles include an initial resource block bundle for the interleaved mapping, and a quantity of virtual resource blocks in the initial resource block bundle is less than the size of the resource block bundle.

In this embodiment of this application, because the quantity of virtual resource blocks in the initial resource block bundle may be less than the size of the resource block bundle, the quantity of virtual resource blocks in the initial resource block bundle may be flexibly set as required, so that the initial resource block bundle is aligned with an initial precoding resource block group in the bandwidth part, thereby effectively improving accuracy of channel estimation and improving data transmission performance.

It should be noted that: (1) the quantity of virtual resource blocks in the initial resource block bundle may alternatively be equal to the size of the resource block bundle; (2) that the mapping unit performs interleaved mapping to the plurality of resource block bundles may include performing interleaved mapping or de-interleaved mapping to the plurality of resource block bundles, and this is not specifically limited herein; and (3) the wireless communication apparatus may be a terminal device or a chip in the terminal device; or the wireless communication apparatus may be a network device or a chip in the network device.

In a possible design, the quantity of virtual resource blocks included in the initial resource block bundle is equal to: an absolute value of a difference between the size of the resource block bundle and a remainder obtained by dividing the resource block start index of the bandwidth part by the size of the resource block bundle.

In a possible design, the processing unit is specifically configured to determine the quantity of virtual resource blocks included in the initial resource block bundle according to the following formula:

$$n = L - N_{BWP}^{start} \bmod L$$

where n is the quantity of virtual resource blocks included in the initial resource block bundle, L is the size of the resource block bundle, and $N_{BWP}^{start}$ is the resource block start index of the bandwidth part.

In a possible design, the processing unit is further configured to process higher layer signaling, where the higher layer signaling is used to indicate the size of the resource block bundle, and the size of the resource block bundle is equal to a quantity of resource blocks included in the resource block bundle.

Herein, if the wireless communication apparatus is a network device, the wireless communication apparatus further includes a transceiver unit. Herein, that the processing unit processes higher layer signaling is specifically: The processing unit generates the higher layer signaling, and sends the higher layer signaling to a terminal device by using the transceiver unit. If the wireless communication apparatus is a terminal device, the wireless communication apparatus further includes a transceiver unit. The transceiver unit is configured to receive higher layer signaling from a network device, and the processing unit parses the higher layer signaling.

In a possible design, the bandwidth part includes the plurality of resource block bundles and at least one remaining resource block, where the interleaved mapping has not been performed to the remaining resource block; and the mapping unit is further configured to directly map an index of a virtual resource block corresponding to the remaining resource block to an index of a physical resource block.

According to a second aspect, an embodiment of this application provides a wireless communication method, where the method is performed by a wireless communication apparatus. The method includes: determining indexes of virtual resource blocks in a plurality of resource block bundles based on a resource block start index of a bandwidth part and a size of a resource block bundle. The method also includes performing interleaved mapping to the plurality of resource block bundles, to determine indexes of physical resource blocks corresponding to the indexes of the virtual resource blocks.

The plurality of resource block bundles include an initial resource block bundle for the interleaved mapping, and a quantity of virtual resource blocks in the initial resource block bundle is less than the size of the resource block bundle.

In a possible design, the quantity of virtual resource blocks included in the initial resource block bundle is equal to: an absolute value of a difference between the size of the resource block bundle and a remainder obtained by dividing the resource block start index of the bandwidth part by the size of the resource block bundle.

In a possible design, the determining indexes of virtual resource blocks in a plurality of resource block bundles based on a resource block start index of a bandwidth part and a size of a resource block bundle includes: determining the quantity of virtual resource blocks included in the initial resource block bundle according to the following formula:

$$n = L - N_{BWP}^{start} \bmod L$$

where n is the quantity of virtual resource blocks included in the initial resource block bundle, L is the size of the resource block bundle, and $N_{BWP}^{start}$ is the resource block start index of the bandwidth part.

In a possible design, the method further includes: processing higher layer signaling, where the higher layer signaling is used to indicate the size of the resource block bundle, and the size of the resource block bundle is equal to a quantity of resource blocks included in the resource block bundle.

In a possible design, the bandwidth part includes the plurality of resource block bundles and at least one remaining resource block, where the interleaved mapping has not been performed to the remaining resource block; and the method further includes: directly mapping an index of a virtual resource block corresponding to the remaining resource block to an index of a physical resource block.

According to a third aspect, an embodiment of this application provides a wireless communication apparatus, including: a processing unit and a storage unit.

The storage unit is configured to store a computer instruction, and when the computer instruction is run on the processing unit, the wireless communication apparatus performs the method procedures described in the second aspect.

Herein, the storage unit may be a transitory memory, to be specific, for temporary storage, and data is lost upon a power outage. The transitory memory may be, for example, a dynamic random access memory (DRAM), or a cache, or a register (registers) in a processor.

According to a fourth aspect, an embodiment of this application provides a computer readable storage medium. The computer readable storage medium stores program code, and when the program code is executed by a wireless communication apparatus, the wireless communication apparatus performs the method procedures described in the second aspect.

According to a fifth aspect, an embodiment of this application provides a computer program product. When program code included in the computer program product is executed by a wireless communication apparatus, the wireless communication apparatus performs the method procedures described in the second aspect.

In a possible design, a size of an initial resource block bundle is equal to a size of a resource block bundle, and the initial resource block bundle includes at least one padding resource block and at least one virtual resource block; or a size of the initial resource block bundle is equal to a quantity of virtual resource blocks included in the initial resource block bundle.

In a possible design, the wireless communication apparatus is a semiconductor chip, and the semiconductor chip is set in a terminal or a base station.

In a possible design, the wireless communication apparatus is a terminal, the wireless communication apparatus further includes a receiving unit, and the receiving unit is configured to receive higher layer signaling, where the higher layer signaling is used to indicate the size of the resource block bundle.

In a possible design, the wireless communication apparatus is a base station, the wireless communication apparatus further includes a sending unit, and the sending unit is configured to send higher layer signaling, where the higher layer signaling is used to indicate the size of the resource block bundle.

BRIEF DESCRIPTION OF THE DRAWINGS

FIG. 4a-1 to FIG. 4a-3 are a schematic diagram of a specific process in which a terminal device determines indexes of PRBs corresponding to indexes of VRBs in the prior art;

FIG. 4b-1 to FIG. 4b-3 are a schematic diagram of a specific process in which a terminal device determines indexes of PRBs corresponding to indexes of VRBs according to Embodiment 1 of this application;

FIG. 4c-1 to FIG. 4c-3 are a schematic diagram of a specific process in which a terminal device determines indexes of PRBs corresponding to indexes of VRBs according to Embodiment 2 of this application;

FIG. 4d-1 to FIG. 4d-3 are a schematic diagram of a specific process in which a terminal device determines indexes of PRBs corresponding to indexes of VRBs according to Embodiment 3 of this application;

DETAILED DESCRIPTION OF ILLUSTRATIVE EMBODIMENTS

The following specifically describes the embodiments of this application with reference to the accompanying drawings of this specification.

Figure 1:
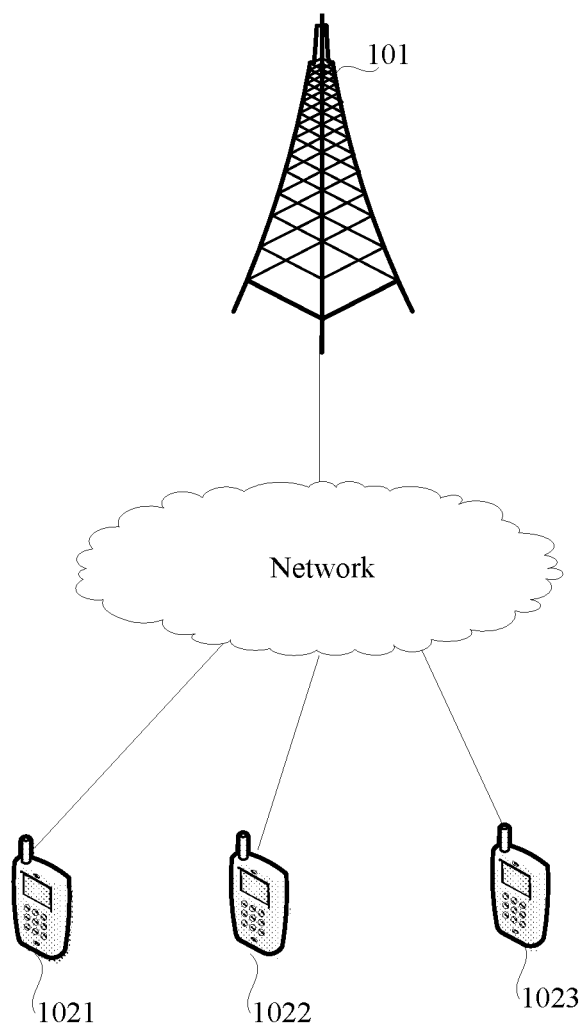
FIG. 1 is a schematic diagram of a system architecture to which this application is applicable.

FIG. 1 is a schematic diagram of a system architecture to which an embodiment of this application is applicable. As shown in FIG. 1, the system architecture includes a network device 101 and one or more terminal devices, such as a terminal device 1021, a terminal device 1022, and a terminal device 1023 shown in FIG. 1. The network device 101 may transmit downlink data to the terminal device 1021, the terminal device 1022, and the terminal device 1023 through a network. The terminal device 1021, the terminal device 1022, and the terminal device 1023 may transmit uplink data to the network device 101 through the network.

In this application, the network device may be a base station (BS) device. The base station device may also be referred to as a base station, which is an apparatus deployed in a radio access network to provide a wireless communication function. For example, devices that provide a base station function in a 2G network include a base transceiver station (BTS) and a base station controller (BSC). Devices that provide a base station function in a 3G network include a NodeB and a radio network controller (RNC). Devices that provide a base station function in a 4G network include an evolved NodeB (eNB). Devices that provide a base station function in a 5G network include a new radio NodeB (gNB), a centralized unit (CU), a distributed unit (DU), and a new radio controller.

The terminal device is a device having a wireless transceiver function, and may be deployed on land, including an indoor or outdoor device, a handheld device, or an in-vehicle device; or may be deployed on water (for example, on a ship); or may be deployed in the air (for example, on an airplane, a balloon, or a satellite). The terminal device may be a mobile phone, a tablet computer (e.g. Pad), a computer having a wireless transceiver function, a virtual reality (VR) terminal device, an augmented reality (AR) terminal device, a wireless terminal device in industrial control, a wireless terminal device in self-driving, a wireless terminal device in remote surgery, a wireless terminal device in a smart grid, a wireless terminal device in transportation safety, a wireless terminal device in a smart city, a wireless terminal device in a smart home, or the like.

This application is mainly described by using the system architecture shown in FIG. 1 as an example, but this is not limited herein.

Communication systems to which the foregoing system architecture is applicable include but are not limited to: a time-division duplex-long term evolution (TDD LTE) system, a frequency-division duplex-long term evolution (FDD LTE) system, a long term evolution-advanced (LTE-A) system, and various future evolved wireless communications systems (for example, a 5G NR system).

Figure 2:
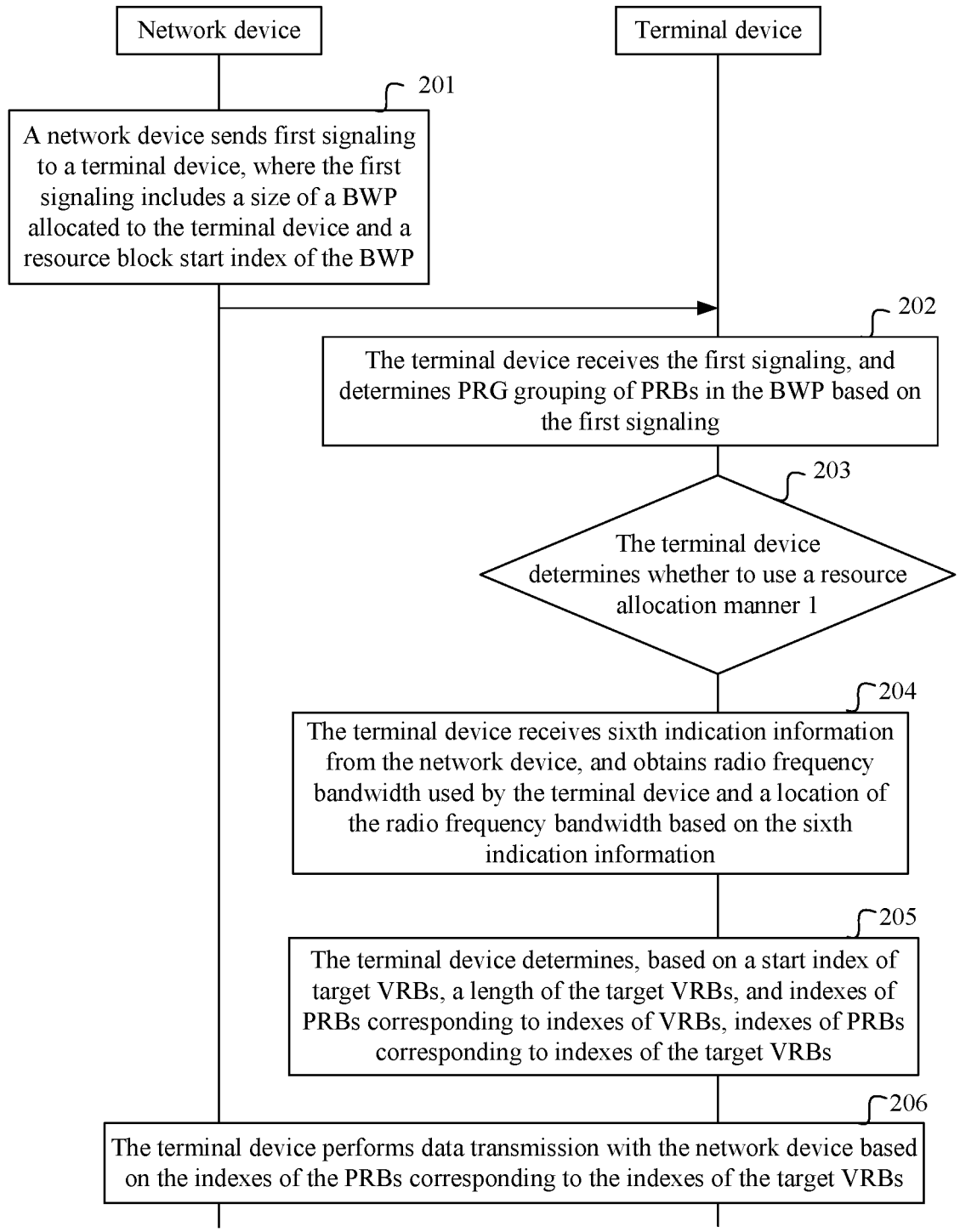
FIG. 2 is a schematic diagram of data transmission between a network device and a terminal device.

Based on the system architecture shown in FIG. 1, FIG. 2 is a schematic diagram of data transmission between a network device and a terminal device. As shown in FIG. 2, the following steps are included.

Step 201: The network device sends first signaling to the terminal device, where the first signaling may include a size of a bandwidth part (BWP) allocated to the terminal device and a resource block start index of the BWP.

Herein, the first signaling may be a broadcast message, RRC signaling, or the like, and is not specifically limited.

The size of the BWP may be specifically a quantity of PRBs included in the BWP. For example, the size of the BWP is 50 PRBs. The resource block start index of the BWP may be specifically an offset (which may be measured in PRBs) of the BWP relative to a common resource block (CRB). For example, if the offset of the BWP relative to a CRB 0 is 25, the resource block start index of the BWP is 25.

Further, the first signaling may further include a size of a preset precoding resource block group (PRG), where the size of the preset PRG may be 2, 4, or scheduled bandwidth (scheduled BW). This embodiment of this application is mainly described by using an example in which the size of the preset PRG is 4.

It should be noted that the size of the BWP, the resource block start index of the BWP, and the size of the preset PRG may be sent by using one piece of signaling, or may be sent by using a plurality of pieces of signaling. This is not specifically limited.

Step 202: The terminal device receives the first signaling, and determines PRG grouping of PRBs in the BWP based on the first signaling.

Specifically, a quantity of PRBs in the first PRG (PRG 0) may be determined based on the resource block start index of the BWP and a size of an RB bundle. For details, refer to the following formula:

$$m1 = P'_{BWP,i} - N_{BWP,i}^{start} \bmod P'_{BWP}$$

where m1 is the quantity of PRBs in the first PRG (namely, the PRG 0, which may also be referred to as an initial PRG), $N_{BWP,i}^{start}$ is a resource block start index of a BWP i, and $N'_{BWP,i}$ is a size (which may be configured by a higher layer, for example, is 4) of the PRG.

A quantity of PRBs in the last PRG may be determined based on the resource block start index of the BWP, the size of the BWP, and the size of the RB bundle. For details, refer to the following formula:

$$m2 = (N_{BWP,i}^{start} + N_{BWP,i}^{size}) \bmod P'_{BWP,i}$$

where m2 is the quantity of PRBs in the last PRG, $N_{BWP,i}^{size}$ is a size of the BWP i, $N_{BWP,i}^{start}$ is the resource block start index of the BWP i, and $P'_{BWP,i}$ is the size of the PRG.

Figure 3A:
FIG. 3a is a schematic diagram of PRGs on a BWP.

In an example, the size of the PRG is 4, the size of the BWP is 50 PRBs, and the resource block start index of the BWP is 25. In this case, the size of the first PRG in the BWP is 4-25 mod 4=3, the size of the last PRG is (25+50) mod 4=3, and a size of a remaining PRG is 4. FIG. 3*a* is a schematic diagram of PRGs on the BWP.

Step 203: The terminal device determines whether to use a resource allocation manner 1, and performs step 204 if the resource allocation manner 1 is to be used, or performs an existing procedure if the resource allocation manner 1 is not to be used. Details are not described herein.

Specifically, there may be a plurality of manners in which the terminal device determines whether to use the resource allocation manner 1. For example, the terminal device may determine, based on signaling of the network device or whether to receive fallback DCI, whether to use the resource allocation manner 1. For example, if the terminal device receives second signaling, where the second signaling instructs the terminal device to use the resource allocation manner 1, the terminal device determines to use the resource allocation manner 1, where the second signaling may be higher layer signaling or physical layer signaling (for example, frequency domain resource allocation information in scheduling DCI). Alternatively, if the terminal device determines to receive the fallback DCI, the terminal device determines to use the resource allocation manner 1.

Step 204: The terminal device reads a resource indication value (RIV) from the received DCI, where the RIV is used to indicate a start index of target VRBs and a length of the target VRBs.

Herein, the target VRB is a VRB allocated to the terminal device.

Step 205: The terminal device determines, based on the start index of the target VRBs, the length of the target VRBs, and indexes of PRBs corresponding to indexes of VRBs, indexes of PRBs corresponding to indexes of the target VRBs.

Step 206: The terminal device performs data transmission with the network device based on the indexes of the PRBs corresponding to the indexes of the target VRBs.

Specifically, based on the indexes of the PRBs corresponding to the indexes of the target VRBs, the terminal device may send uplink data to the network device on the corresponding PRBs or receive, on the corresponding PRBs, downlink data sent by the network device.

For the foregoing procedure, taking that the terminal device sends the uplink data to the network device as an example, the terminal device needs to first determine the indexes of the PRBs corresponding to the indexes of the VRBs, and then obtain the indexes of the PRBs corresponding to the indexes of the target VRBs, to send the uplink data.

Figures 3, 4A:
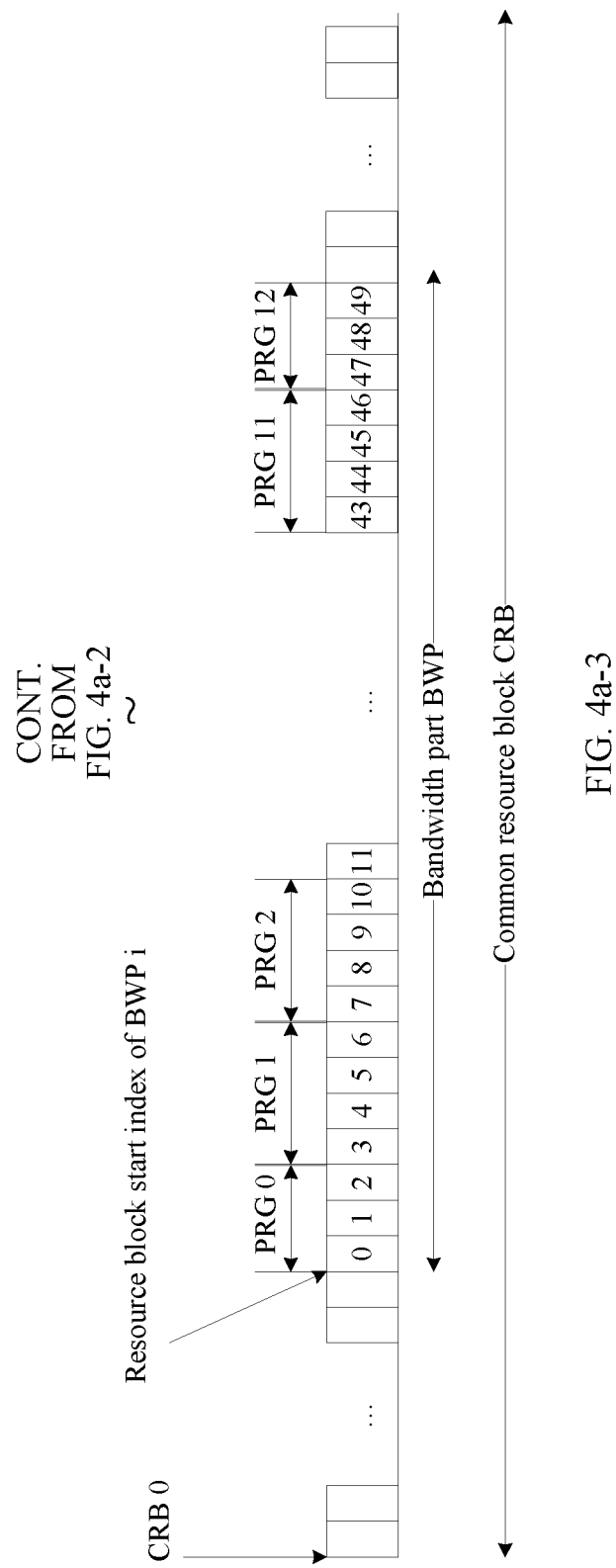

FIG. 4a-1 to FIG. 4a-3 are a schematic diagram of a specific process in which a terminal device determines indexes of PRBs corresponding to indexes of VRBs. As shown in FIG. 4a-1 to FIG. 4a-3, for interleaved VRB-to-PRB mapping, a smallest unit of the interleaved mapping is a resource block bundle (RB bundle), and a size of the RB bundle may be the same as or different from a size of a PRG. Herein, for example, the size of the RB bundle may be the same as the size of the PRG, both the size of the RB bundle and the size of the PRG are 4, and an RB bundle i includes RBs {iL, iL+1, . . . , iL+L−1} (where L is the size of the RB bundle). For example, an RB bundle 0 includes an RB 0, an RB 1, an RB 2, and an RB 3, and an RB bundle 1 includes an RB 4, an RB 5, an RB 6, and an RB 7.

As shown in FIG. 4a-1 to FIG. 4a-3, a row-in column-out interleaver is used for the interleaved mapping. When the size of the BWP is 50, and a quantity of rows of the interleaver is 2 (in this embodiment of this application, that the quantity of rows of the interleaver is 2 is merely used as an example, and the quantity may also be another value, which is not specifically limited), a quantity of columns of the interleaver is a value obtained by rounding up 50/(4*2), namely, 7, and a total of 56 (7*2*4) VRBs are required in this case. However, because there are 50 VRBs in total, six RBs need to be padded to implement an interleaving process. An RB 50 to an RB 55 shown in FIG. 4a-1 to FIG. 4a-3 are padding RBs, where the RB 50 and the RB 51 are padded in an RB bundle 12, and the RB 52 to the RB 55 are padded in an RB bundle 13. Indexes of PRBs corresponding to indexes of VRBs may be obtained through the interleaved mapping and removal of the padding RBs. Table 1 shows an example of some indexes of PRBs corresponding to indexes of VRBs.

TABLE 1

Example of some indexes of PRBs corresponding to indexes of VRBs

|  | RB bundle 0 | | | | RB bundle 2 | | | | . . . |
| --- | --- | --- | --- | --- | --- | --- | --- | --- | --- |
| Indexes of VRBs | 0 | 1 | 2 | 3 | 8 | 9 | 10 | 11 | . . . |
|  | PRG 0 | | | | PRG 1 | | | . . . | . . . |
| Indexes of PRBs | 0 | 1 | 2 | 3 | 4 | 5 | 6 | . . . | . . . |

It can be seen from Table 1 that, because the PRG 0 includes only three PRBs, indexes (0/1/2/3) of VRBs in the RB bundle 0 respectively correspond to indexes (0/1/2) of the PRBs in the PRG 0 and an index (3) of a PRB in the PRG 1, and consequently boundaries of the RB bundle and the PRG are not aligned (in other words, the RB bundle 0 is not aligned with the PRG 0).

Figure 3B:
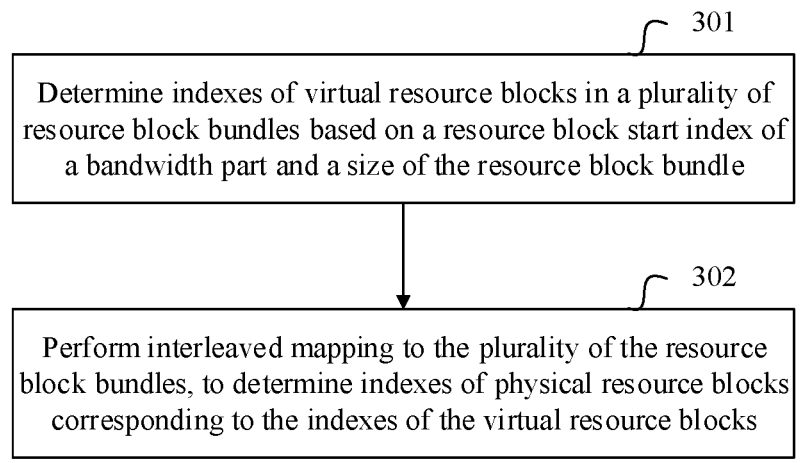
FIG. 3b is a schematic flowchart corresponding to a wireless communication method according to an embodiment of this application.

Based on this, FIG. 3b is a schematic flowchart corresponding to a wireless communication method according to an embodiment of this application. As shown in FIG. 3b, the method includes the following steps.

Step 301: Determine indexes of virtual resource blocks in a plurality of resource block bundles based on a resource block start index of a bandwidth part and a size of a resource block bundle.

Step 302: Perform interleaved mapping to the plurality of resource block bundles, to determine indexes of physical resource blocks corresponding to the indexes of the virtual resource blocks.

The plurality of resource block bundles include an initial resource block bundle for the interleaved mapping, and a quantity of virtual resource blocks in the initial resource block bundle is less than the size of the resource block bundle.

In this embodiment of this application, because the quantity of virtual resource blocks in the initial resource block bundle may be less than the size of the resource block bundle, the quantity of virtual resource blocks in the initial resource block bundle may be flexibly set as required, so that the initial resource block bundle is aligned with an initial precoding resource block group in the bandwidth part, thereby effectively improving accuracy of channel estimation and improving data transmission performance.

The following describes the wireless communication method in this embodiment of this application with reference to specific embodiments.

Embodiment 1

Figures 3, 4B:
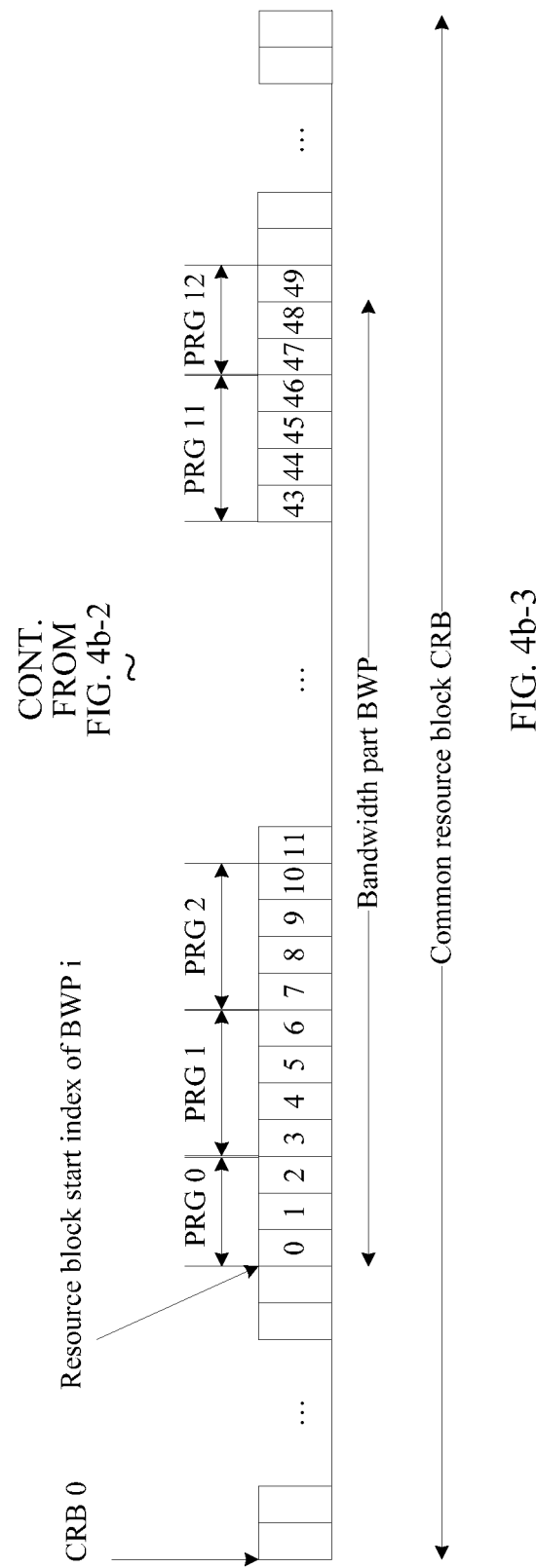

As shown in FIG. 4b-1 to FIG. 4b-3, Embodiment 1 of this application provides a solution to resolve a technical problem that boundaries of an RB bundle and a PRG are not aligned. Specifically, a quantity of virtual resource blocks included in an initial resource block bundle may be determined based on a resource block start index of a bandwidth part and a size of a resource block bundle, and indexes of the virtual resource blocks included in the initial resource block bundle are further determined based on the quantity of virtual resource blocks included in the initial resource block bundle.

In a possible implementation, the quantity of virtual resource blocks included in the initial resource block bundle is equal to an absolute value of a difference between the size of the resource block bundle and a remainder obtained by dividing the resource block start index of the bandwidth part by the size of the resource block bundle. In an example, the quantity of virtual resource blocks included in the initial resource block bundle may be determined according to the following formula:

$$n = L - N_{BWP,i}^{start} \bmod L$$

where n is the quantity of virtual resource blocks included in the initial resource block bundle (namely, an RB bundle 0), L is the size of the RB bundle, and $N_{BWP,i}^{start}$ is a resource block start index of a BWP i.

In another example, the quantity of virtual resource blocks included in the initial resource block bundle may be determined according to the following formula:

$$n = L - \left( N_{BWP,i}^{start} - L \left\lfloor \frac{N_{BWP,i}^{start}}{L} \right\rfloor \right)$$

where n is the quantity of virtual resource blocks included in the initial resource block bundle (namely, an RB bundle 0), L is the size of the RB bundle, and $N_{BWP,i}^{start}$ is a resource block start index of a BWP i.

Further, a quantity of RBs that need to be padded in the RB bundle 0 may be determined based on the quantity of virtual resource blocks included in the RB bundle 0 and the size of the RB bundle. After padding, the RB bundle 0 includes $$\left\{ \underbrace{X \ldots X}_{N_{BWP,i}^{start} \bmod L}\ RB(0) \ldots RB(L'-1) \right\},$$

where X is a padding RB, L is the size of the RB bundle, and $L'=L-N_{BWP,i}^{start} \bmod L$. For example, a quantity of PRBs included in a PRG 0 is 3, and a quantity of VRBs included in the RB bundle 0 is 4. In this case, one RB needs to be padded in the RB bundle 0. A padding position is not limited in this embodiment of this application. FIG. 4*b*-1 to FIG. 4*b*-3 are a schematic diagram after the padding, and the RB bundle 0 includes (X, RB 0, RB 1, RB 2).

In this case, it may be understood that a size of the initial resource block bundle is equal to the size of the resource block bundle, and the initial resource block bundle includes at least one padding resource block and at least one virtual resource block. To be specific, it may be considered that the size of the RB bundle 0 in the foregoing example is 4, and the RB bundle 0 includes one padding resource block (namely, X) and three virtual resource blocks (namely, the RB 0, RB 1, and RB 2). Alternatively, it may be understood that a size of the initial resource block bundle is equal to the quantity of virtual resource blocks included in the initial resource block bundle. To be specific, it may be considered that the size of the RB bundle 0 in the foregoing example depends only on the quantity of virtual resource blocks included in the RB bundle 0, and therefore the size of the RB bundle 0 is 3.

Indexes of PRBs corresponding to indexes of VRBs may be obtained through the interleaved mapping and removal of the padding RBs. Table 2 shows an example of some indexes of PRBs corresponding to indexes of VRBs.

TABLE 2

Example of some indexes of PRBs corresponding to indexes of VRBs

|  | RB bundle 0 |  |  | RB bundle 2 |  |  |  |
|---|---|---|---|---|---|---|---|
| Indexes of VRBs | 0 | 1 | 2 | 7 | 8 | 9 | 10 | ... |
|  | PRG 0 |  |  | PRG 1 |  |  | ... |
| Indexes of PRBs | 0 | 1 | 2 | 3 | 4 | 5 | 6 | ... |

It can be seen from Table 2 that, the PRG 0 includes only three PRBs, and the RB bundle 0 also includes three VRBs because one RB is padded, so that indexes (0/1/2) of the VRBs in the RB bundle 0 respectively correspond to indexes (0/1/2) of the PRBs in the PRG 0 by modifying a padding rule of an interleaver, and boundaries of the RB bundle and the PRG are aligned.

Embodiment 2

Figures 3, 4C:
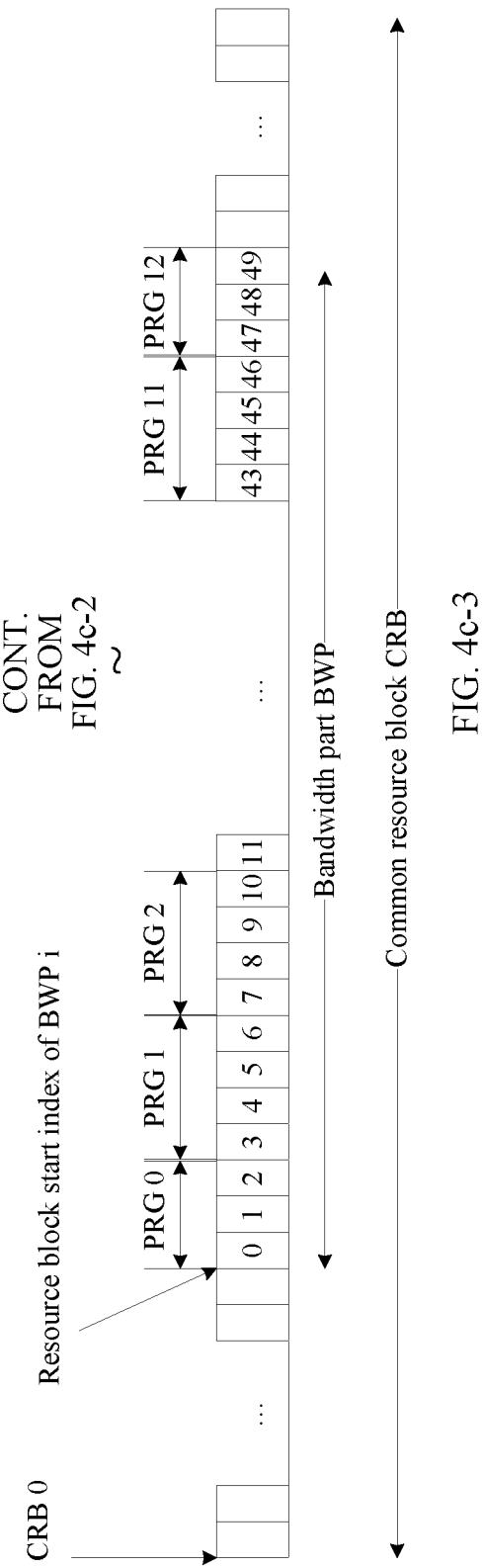

For a solution in an existing technology, an RB bundle 12 includes two padding RBs, and after the padding RBs are removed, the RB bundle 12 includes only two VRBs. However, PRGs other than a PRG 0 and a PRG 12 each include four PRBs. In this case, because the RB bundle 12 is located in a middle position, RB bundles following the RB bundle 12 are not aligned with PRGs. To resolve this problem, this embodiment of this application provides a solution, as shown in FIG. 4*c*-1 to FIG. 4*c*-3.

Specifically, in the solution described above, a round-up manner is used when a quantity of columns of an interleaver is calculated. In this embodiment of this application, a round-down manner may be used to calculate a quantity of columns of an interleaver, as shown in the following formula:

$$C = \left\lfloor \frac{N_{BWP,i}^{size}}{LR} \right\rfloor$$

where C is the quantity of columns of the interleaver, R is a quantity of rows of the interleaver (which is 2 in an existing protocol), $N_{BWP,i}^{size}$ represents a size of a BWP i, $N_{BWP,i}^{start}$ represents a resource block start index of the BWP i, and L is a size of an RB bundle.

According to the foregoing manner, when a size of a BWP is 50, and the quantity of rows of the interleaver is 2, the quantity of columns of the interleaver is a value obtained by rounding down 50/(4*2), namely, 6. In this case, a total of 48 (6*2*4) VRBs are required to perform interleaved mapping, and two VRBs (a VRB 48 and a VRB 49) not participating in the interleaved mapping may be directly placed after an RB bundle 11. In this way, indexes of PRBs corresponding to indexes of VRBs may be obtained. Table 3 shows an example of some indexes of PRBs corresponding to indexes of VRBs.

TABLE 3

Example of some indexes of PRBs corresponding to indexes of VRBs

|  | RB bundle 0 |  |  |  | RB bundle 2 |  |  |  | ... |
|---|---|---|---|---|---|---|---|---|---|
| Indexes of VRBs | 0 | 1 | 2 | 3 | 8 | 9 | 10 | 11 | ... |
|  | PRG 0 |  |  |  | PRG 1 |  |  | ... | ... |
| Indexes of PRBs | 0 | 1 | 2 | 3 | 4 | 5 | 6 | ... | ... |

It can be seen from Table 3 that, each RB bundle participating in the interleaved mapping includes four VRBs. Therefore, a technical problem that channel estimation is inaccurate because an RB bundle and a PRG are not aligned due to existence of padding RBs in some RB bundles (especially an RB bundle mapped to a middle position, for example, the RB bundle 12) participating in interleaved mapping can be effectively avoided.

Embodiment 3

Figures 3, 4D:

Embodiment 3 of this application provides a solution to implement complete alignment between an RB bundle and a PRG while resolving technical problems that a RB bundle 0 and a PRG 0 are not aligned and an RB bundle and a PRG are not aligned due to existence of padding RBs in some RB bundles participating in interleaved mapping, as shown in FIG. 4*d*-1 to FIG. 4*d*-3.

Specifically, a quantity of RBs that need to be padded in the RB bundle 0 may be determined based on a quantity of PRBs included in the PRG 0 and a quantity of VRBs included in the RB bundle 0. After padding, the RB bundle 0 includes $$\{\underbrace{X \ldots X}_{N_{BWP,i}^{start} \bmod L} RB(0) \ldots RB(L'-1)\},$$

where X is a padding RB, L is a size of the RB bundle, and $L'=L-N_{BWP,i}^{start} \bmod L$. For example, the quantity of PRBs included in the PRG 0 is 3, and the quantity of VRBs included in the RB bundle 0 is 4. In this case, one RB needs to be padded in the RB bundle 0. FIG. 4d-1 to FIG. 4d-3 are a schematic diagram after the padding, and the RB bundle 0 includes (X, RB 0, RB 1, RB 2). RBs included in a remaining RB bundle i are as follows:

$$\{iL-N_{BWP,i}^{start} \bmod L, iL+1-N_{BWP,i}^{start} \bmod L, \ldots, iL+L-1-N_{BWP,i}^{start} \bmod L\}.$$

For example, an RB bundle 1 includes (RB 3, RB 4, RB 5, and RB 6).

Further, after the padding, a quantity of columns of an interleaver may be calculated in a round-down manner, as shown in the following formula:

$$C=\lfloor (N_{BWP,i}^{size}+(N_{BWP,i}^{start} \bmod L))/(LR) \rfloor$$

where C is the quantity of columns of the interleaver, R is a quantity of rows of the interleaver (which is 2 in an existing protocol), $N_{BWP,i}^{size}$ represents a size of a BWP i, $N_{BWP,i}^{start}$ represents a resource block start index of the BWP i, and L is a size of an RB bundle. ($N_{BWP,i}^{size}+N_{BWP,i}^{start} \bmod L-LRC$) VRBs not participating in the interleaved mapping correspond to the last ($N_{BWP,i}^{size}+N_{BWP,i}^{start} \bmod L-LRC$) PRBs of the BWP i.

For example, when a size of a BWP is 50, a resource block start index of the BWP is 25, the size of the RB bundle is 4, and the quantity of rows of the interleaver is 2, the quantity of columns of the interleaver is a value obtained by rounding down (50+1)/(4*2), namely, 6. In this case, a total of 48 (6*2*4) VRBs are required to perform the interleaved mapping, and three VRBs (a VRB 47, a VRB 48, and a VRB 49) not participating in the interleaved mapping may be directly placed after an RB bundle 11. In this way, indexes of PRBs corresponding to indexes of VRBs may be obtained. Table 4 shows an example of some indexes of PRBs corresponding to indexes of VRBs.

TABLE 4

Example of some indexes of PRBs corresponding to indexes of VRBs

| | RB bundle 0 | | | RB bundle 2 | | | |
|---|---|---|---|---|---|---|---|
| Indexes of VRBs | 0 | 1 | 2 | 7 | 8 | 9 | 10 | ... |
| | PRG 0 | | | PRG 1 | | | ... |
| Indexes of PRBs | 0 | 1 | 2 | 3 | 4 | 5 | 6 | ... |

It can be seen from Table 4 that, the PRG 0 includes only three PRBs, and the RB bundle 0 also includes three VRBs because one RB is padded, so that indexes (0/1/2) of the VRBs in the RB bundle 0 respectively correspond to indexes (0/1/2) of the PRBs in the PRG 0, and the RB bundle 0 and the PRG 0 are aligned. In addition, RB bundles, other than the RB bundle 0, that participate in the interleaved mapping each include four VRBs, so that indexes of VRBs in an RB bundle 1 to an RB bundle 11 respectively correspond to indexes of PRBs in a PRG 1 to a PRG 11, and three VRBs not participating in the interleaved mapping respectively correspond to indexes of three PRBs in a PRG 12, thereby implementing complete alignment between the RB bundle and the PRG.

According to the embodiments of this application, in Embodiment 1, only the padding rule of the interleaver is modified, to be specific, a corresponding quantity of RBs are padded in the RB bundle 0, without changing the interleaver in a current technology, thereby aligning boundaries of the RB bundle and the PRG; in Embodiment 2, the quantity of columns of the interleaver is modified (one column less than that of the interleaver in the current technology), and thereby RBs do not need to be padded in the RB bundle, so that each RB bundle participating in the interleaved mapping includes four VRBs, thereby effectively avoiding a problem that an RB bundle and a PRG are not aligned because the RB bundle has less than four VRBs due to existence of padding RBs; and in Embodiment 3, the solutions in Embodiment 1 and Embodiment 2 are combined, so that the RB bundle can be completely aligned with the PRG.

Based on the foregoing descriptions, that the terminal device uses the solution in Embodiment 3 to determine the indexes of the PRBs corresponding to the indexes of the VRBs is used as an example. In the procedure shown in FIG. 2, if a start index of target VRBs that is obtained by the terminal device is 0 and a length of the target VRBs is 6, indexes of the target VRBs of the terminal device are 0, 1, 2, 3, 4, and 5. Further, the terminal device may determine, based on the indexes of the target VRBs and the determined indexes of the PRBs corresponding to the indexes of the VRBs, that the indexes of the PRBs corresponding to the indexes of the target VRBs are 0, 1, 2, 23, 24, and 25; and then may send uplink data to the network device on a PRB 0, a PRB 1, a PRB 2, a PRB 23, a PRB 24, and a PRB 25.

It should be noted that, an example in which the terminal device sends the uplink data to the network device is used above, and therefore an operation performed by the terminal device is interleaving. If the terminal device receives downlink data from the network device, an operation performed by the terminal is de-interleaving. A specific implementation and the interleaving process described above belong to a same inventive concept, and details are not described herein again.

Corresponding to the foregoing method procedure, an embodiment of this application further provides a wireless communication apparatus. For a specific implementation of the wireless communication apparatus, refer to the foregoing method procedure.

Figure 5A:
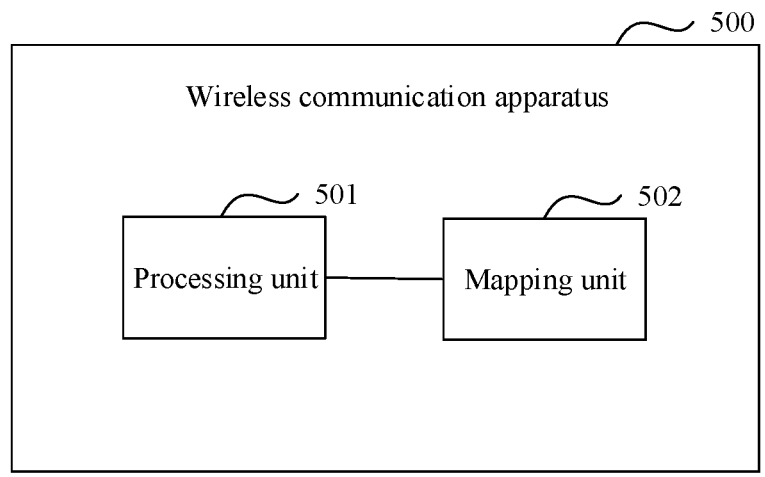
FIG. 5a is a schematic structural diagram of a wireless communication apparatus according to an embodiment of this application.

FIG. 5a is a schematic structural diagram of a wireless communication apparatus according to an embodiment of this application. As shown in FIG. 5a, a wireless communication apparatus 500 includes: a processing unit 501, configured to determine indexes of virtual resource blocks in a plurality of resource block bundles based on a resource block start index of a bandwidth part and a size of a resource block bundle; and a mapping unit 502, configured to perform interleaved mapping to the plurality of resource block bundles, to determine indexes of physical resource blocks corresponding to the indexes of the virtual resource blocks.

The plurality of resource block bundles include an initial resource block bundle for the interleaved mapping, and a quantity of virtual resource blocks in the initial resource block bundle is less than the size of the resource block bundle.

In a possible design, the quantity of virtual resource blocks included in the initial resource block bundle is equal to: an absolute value of a difference between the size of the resource block bundle and a remainder obtained by dividing the resource block start index of the bandwidth part by the size of the resource block bundle.

In a possible design, the processing unit 501 is specifically configured to determine the quantity of virtual resource blocks included in the initial resource block bundle according to the following formula:

$$n = L - N_{BWP}^{start} \bmod L$$

where n is the quantity of virtual resource blocks included in the initial resource block bundle, L is the size of the resource block bundle, and $N_{BWP}^{start}$ is the resource block start index of the bandwidth part.

In a possible design, the processing unit 501 is further configured to process higher layer signaling, where the higher layer signaling is used to indicate the size of the resource block bundle, and the size of the resource block bundle is equal to a quantity of resource blocks included in the resource block bundle.

In a possible design, the bandwidth part includes the plurality of resource block bundles and at least one remaining resource block, where the interleaved mapping has not been performed to the remaining resource block.

The mapping unit 502 is further configured to directly map an index of a virtual resource block corresponding to the remaining resource block to an index of a physical resource block.

Figure 5B:
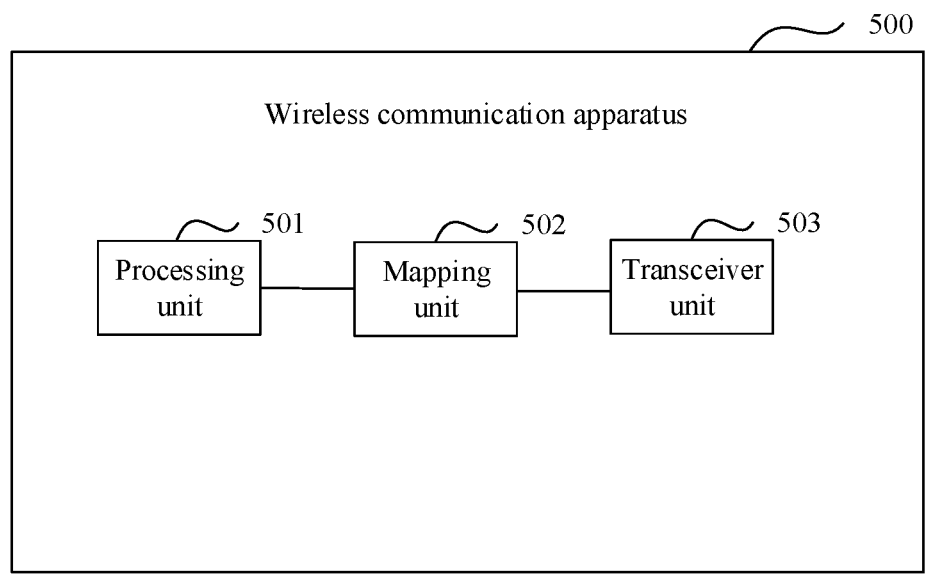
FIG. 5b is a schematic structural diagram of another wireless communication apparatus according to an embodiment of this application.

In this embodiment of this application, if the foregoing wireless communication apparatus is a terminal device or a network device, the wireless communication apparatus may further include a transceiver unit 503, as shown in FIG. 5b. If the wireless communication apparatus is a network device, that the processing unit 501 processes higher layer signaling is specifically: The processing unit 501 generates the higher layer signaling, and sends the higher layer signaling to a terminal device by using the transceiver unit. If the wireless communication apparatus is a terminal device, the transceiver unit 503 is configured to receive higher layer signaling from a network device, and the processing unit 501 parses the higher layer signaling.

It should be noted that the division of the units in this embodiment of this application is an example and is merely logical function division, and there may be another division manner during actual implementation. Function units in this embodiment of this application may be integrated into one processing unit, or each of the units may exist alone physically, or two or more units are integrated into one unit. The foregoing integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, an optical disc, or the like.

Figure 6:
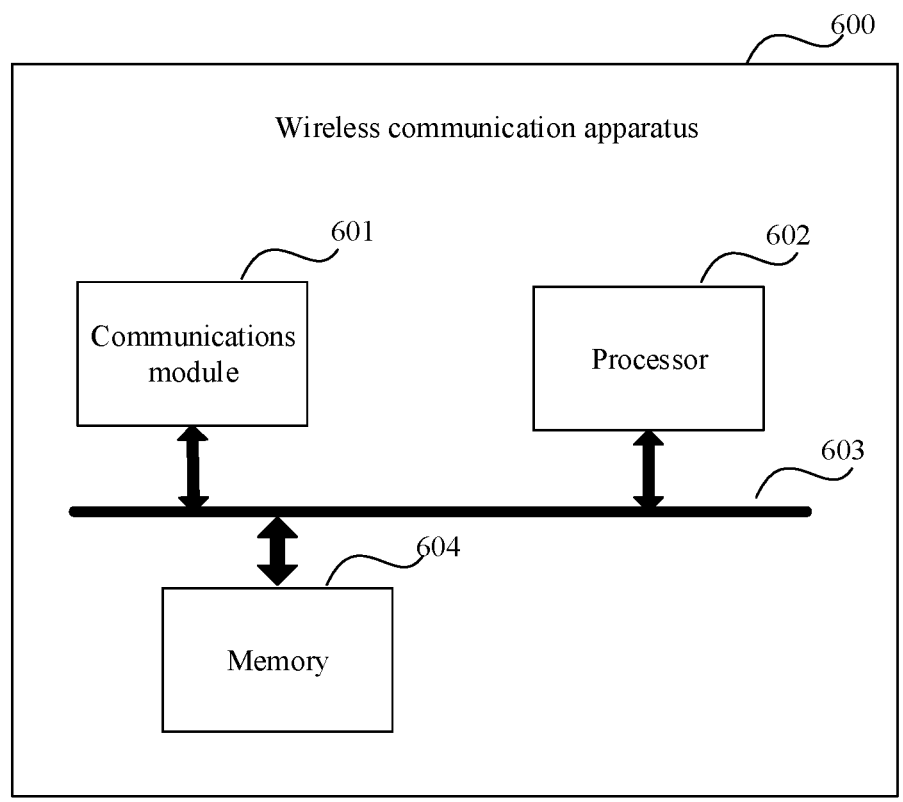
FIG. 6 is a schematic structural diagram of still another wireless communication apparatus according to an embodiment of this application.

FIG. 6 is a schematic structural diagram of another wireless communication apparatus according to an embodiment of this application. The wireless communication apparatus may be a terminal device or a network device. As shown in FIG. 6, a wireless communication apparatus 600 includes a communications module 601 and a processor 602.

The communications module 601 is configured to communicate and interact with another device.

The communications module 601 may be an RF circuit, a Wi-Fi module, a communications interface, a Bluetooth module, or the like.

The processor 602 is configured to implement the steps and procedures in the foregoing method embodiments.

Optionally, the communication apparatus 600 may further include a memory 604, configured to store a program and the like. Specifically, the program may include program code, and the program code includes an instruction. The memory 604 may include a RAM, and may further include a non-volatile memory, for example, at least one magnetic disk memory. The processor 602 executes an application program stored in the memory 604 to implement the foregoing functions.

In a possible implementation, the communications module 601, the processor 602, and the memory 604 are communicatively connected to each other. For example, the communications module 601, the processor 602, and the memory 604 may be connected to each other through a bus 603, and the bus 603 may be a PCI bus or an EISA bus. The bus may be classified into an address bus, a data bus, a control bus, and the like. For ease of representation, only one thick line is used to represent the bus in FIG. 6, but this does not mean that there is only one bus or only one type of bus.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer instructions are loaded and executed on the computer, the procedure or functions according to the embodiments of the present application are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center that are integrated by using one or more usable media. The usable medium may be a magnetic medium (for example, a floppy disk, a hard disk, or a magnetic tape), an optical medium (for example, DVD), a semiconductor medium (for example, a solid state disk (SSD)), or the like.

The embodiments of the present application are described with reference to the flowcharts and/or block diagrams of the method, the device (system), and the computer program product according to the embodiments of the present application. It should be understood that computer instructions may be used to implement each process and/or each block in the flowcharts and/or the block diagrams and a combination of a process and/or a block in the flowcharts and/or the block diagrams. These computer instructions may be provided for a general-purpose computer, a dedicated computer, an embedded processor, or a processor of any other programmable data processing devices to generate a machine, so that the instructions executed by a computer or a processor of any other programmable data processing devices generate an apparatus for implementing a specific function in one or more processes in the flowcharts and/or in one or more blocks in the block diagrams.

These computer instructions may also be stored in a computer readable memory that can instruct the computer or any other programmable data processing devices to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

Apparently, a person skilled in the art can make various modifications and variations to embodiments of the present application without departing from the spirit and scope of this application. This application is intended to cover these modifications and variations provided that they fall within the protection scope defined by the following claims and their equivalent technologies.

What is claimed is:

1. An apparatus, comprising:
one or more processors;
a non-transitory memory coupled to the one or more processors, wherein the non-transitory memory stores a program to be executed by the one or more processors, the program including instructions for:
obtaining a size of an initial virtual resource block bundle, wherein the size of the initial virtual resource block bundle is obtained according to a resource block start position of a bandwidth part and a size of a first virtual resource block bundle, wherein the initial virtual resource block bundle is a starting virtual resource block bundle in a plurality of virtual resource block bundles, the first virtual resource block bundle is a non-starting virtual resource block bundle in the plurality of virtual resource block bundles, and the size of the initial virtual resource block bundle is n, and n meets $n = L - N_{BWP}^{start} \mod L$, wherein L is the size of the first virtual resource block bundle, and $N_{BWP}^{start}$ indicates the resource block start position of the bandwidth part; and
mapping virtual resource blocks in the initial virtual resource block bundle to physical resource blocks.

2. The apparatus according to claim 1, wherein the program further includes instructions for:
processing higher layer signaling, wherein the higher layer signaling indicates the size of the first virtual resource block bundle.

3. The apparatus according to claim 1, wherein the program further includes instructions for:
processing first signaling, wherein the first signaling indicates the resource block start position of the bandwidth part.

4. The apparatus according to claim 1, wherein the instructions for mapping the virtual resource blocks in the initial virtual resource block bundle to the physical resource blocks comprise instructions for:
performing interleaved mapping from the virtual resource blocks in the initial virtual resource block bundle to the physical resource blocks, wherein the bandwidth part comprises the initial virtual resource block bundle and at least one remaining virtual resource block; and
performing non-interleaved mapping from a first virtual resource block corresponding to the at least one remaining virtual resource block to a first physical resource block.

5. The apparatus according to claim 1, wherein the initial virtual resource block bundle is identified as a resource block bundle 0.

6. The apparatus according to claim 1, wherein the apparatus is: a chip, a terminal, or a base station.

7. The apparatus according to claim 1, wherein the program further includes instructions for:
receiving or transmitting higher layer signaling, wherein the higher layer signaling indicates the size of the first virtual resource block bundle.

8. The apparatus according to claim 1, wherein the program further includes instructions for:
receiving or transmitting first signaling, wherein the first signaling indicates the resource block start position of the bandwidth part.

9. A method, comprising:
obtaining a size of an initial virtual resource block bundle, wherein the size of the initial virtual resource block bundle is obtained according to a resource block start position of a bandwidth part and a size of a first virtual resource block bundle, wherein the initial virtual resource block bundle is a starting virtual resource block bundle in a plurality of virtual resource block bundles, the first virtual resource block bundle is a non-starting virtual resource block bundle in the plurality of virtual resource block bundles, and the size of the initial virtual resource block bundle is n, and n meets $n = L - N_{BWP}^{start} \mod L$, wherein L is the size of the first virtual resource block bundle, and $N_{BWP}^{start}$ indicates the resource block start position of the bandwidth part; and
mapping virtual resource blocks in the initial virtual resource block bundle to physical resource blocks.

10. The method according to claim 9, further comprising:
processing higher layer signaling, wherein the higher layer signaling indicates the size of the first virtual resource block bundle.

11. The method according to claim 9, further comprising:
processing first signaling, wherein the first signaling indicates the resource block start position of the bandwidth part.

12. The method according to claim 9, wherein mapping the virtual resource blocks in the initial virtual resource block bundle to the physical resource blocks comprises:

performing interleaved mapping from the virtual resource blocks in the initial virtual resource block bundle to the physical resource blocks;

wherein the bandwidth part comprises the initial virtual resource block bundle and at least one remaining virtual resource block; and wherein the method further comprises:

performing non-interleaved mapping from a first virtual resource block corresponding to the at least one remaining virtual resource block to a first physical resource block.

13. The method according to claim 9, wherein the initial virtual resource block bundle is identified as a resource block bundle 0.

14. The method according to claim 9, wherein the method is performed by a chip, a terminal, or a base station.

15. The method according to claim 9, further comprising: receiving or transmitting higher layer signaling, wherein the higher layer signaling indicates the size of the first virtual resource block bundle.

16. The method according to claim 9, further comprising: receiving or transmitting first signaling, wherein the first signaling indicates the resource block start position of the bandwidth part.

17. A non-transitory computer readable medium, wherein the non-transitory computer readable medium stores instructions that are executable by a computer, and the instructions comprise instructions for:

obtaining a size of an initial virtual resource block bundle, wherein the size of the initial virtual resource block bundle is obtained according to a resource block start position of a bandwidth part and a size of a first virtual resource block bundle, wherein the initial virtual resource block bundle is a starting virtual resource block bundle in a plurality of virtual resource block bundles, the first virtual resource block bundle is a non-starting virtual resource block bundle in the plurality of virtual resource block bundles, the size of the initial virtual resource block bundle is n, and n meets $n = L - N_{BWP}^{start} \bmod L$, wherein L is the size of the first virtual resource block bundle, and $N_{BWP}^{start}$ indicates the resource block start position of the bandwidth part; and mapping virtual resource blocks in the initial virtual resource block bundle to physical resource blocks.

18. The non-transitory computer readable medium according to claim 17, wherein the instructions further comprise instructions for:

processing higher layer signaling, wherein the higher layer signaling indicates the size of the first virtual resource block bundle.

19. The non-transitory computer readable medium according to claim 17, wherein the instructions further comprise instructions for:

processing first signaling, wherein the first signaling indicates the resource block start position of the bandwidth part.

20. The non-transitory computer readable medium according to claim 17, wherein the instructions for mapping the virtual resource blocks in the initial virtual resource block bundle to the physical resource blocks comprise instructions for:

performing interleaved mapping from the virtual resource blocks in the initial virtual resource block bundle to the physical resource blocks, wherein the bandwidth part comprises the initial virtual resource block bundle and at least one remaining virtual resource block; and performing non-interleaved mapping from a first virtual resource block corresponding to the at least one remaining virtual resource block to a first physical resource block.

21. The non-transitory computer readable medium according to claim 17, wherein the initial virtual resource block bundle is identified as a resource block bundle 0.

22. The non-transitory computer readable medium according to claim 17, wherein the instructions further comprise instructions for:

receiving or transmitting higher layer signaling, wherein the higher layer signaling indicates the size of the first virtual resource block bundle.

23. The non-transitory computer readable medium according to claim 17, wherein the instructions further comprise instructions for:

receiving or transmitting first signaling, wherein the first signaling indicates the resource block start position of the bandwidth part.

* * * * *